A. R. LUKENS.
COLORED FIBROUS COMPOSITION AND PROCESS OF MANUFACTURE THEREOF.
APPLICATION FILED NOV. 1, 1920.
1,430,392.
Patented Sept. 26, 1922.
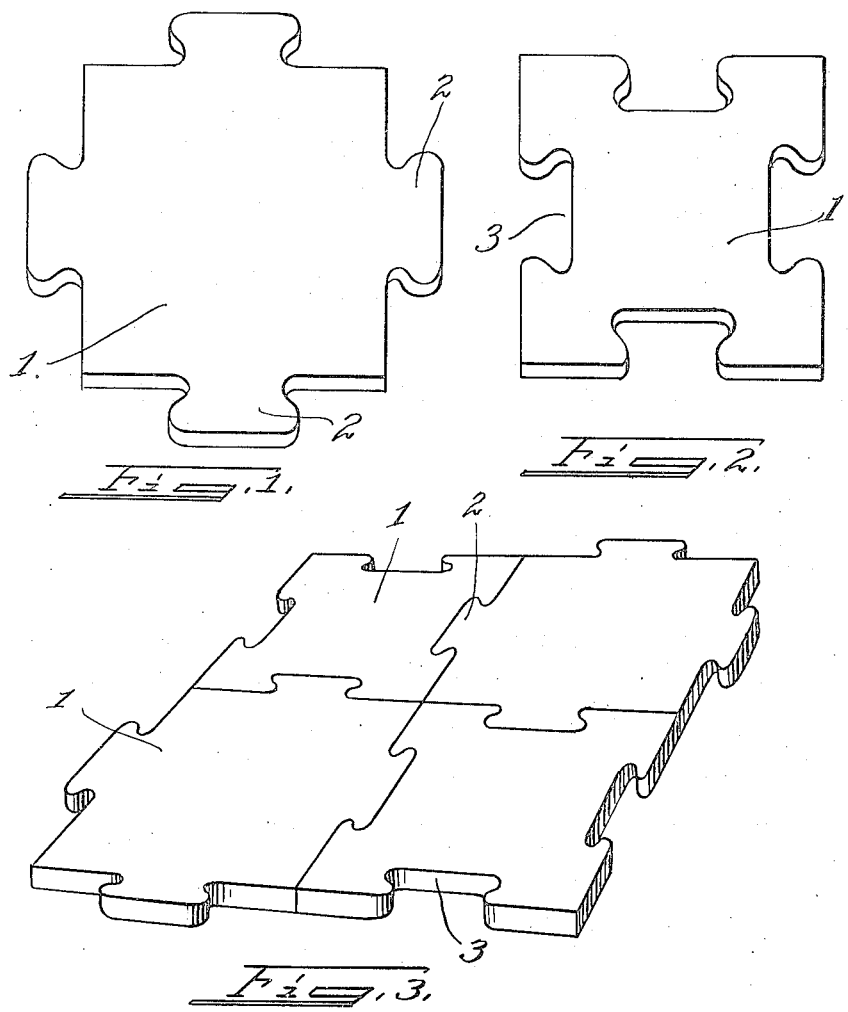

Patented Sept. 26, 1922.

1,430,392

UNITED STATES PATENT OFFICE.

ALAN R. LUKENS, OF WYOMING, OHIO, ASSIGNOR TO THE RICHARDSON COMPANY, OF LOCKLAND, CINCINNATI, OHIO, A CORPORATION OF OHIO.

COLORED FIBROUS COMPOSITION AND PROCESS OF MANUFACTURE THEREOF.

Application filed November 1, 1920. Serial No. 421,148.

*To all whom it may concern:*

Be it known that I, ALAN R. LUKENS, a citizen of the United States, and a resident of Wyoming, Hamilton County, Ohio, have invented a certain new and useful Colored Fibrous Composition and Process of Manufacture Thereof, of which the following is a full, clear, and exact description, reference being had to the drawings forming part of this specification.

This invention has for its object the obtaining of a composition of matter having superior insulating qualities, great durability, flexibility, permanency and resiliency, capable of being easily worked and particularly capable of producing effects of coloring which make it with slight modifications in proportions and treatment available for floor coverings, waterproof coverings, insulations and resilient durable compounds of such wide range of usefulness that it presents the possibilities of a new branch of artistic craftmanship.

In the manufacture of uncolored fibrous compositions, it is old to employ heated pitch, flux oil, asphalts and gilsonite and paper or other fibrous material, mixing and drawing through foraminous plates and rolls or other methods of kneading, thereby producing a durable resilient compound.

It will be noted that compounds of this kind have heretofore been made for homely uses such as roofing, whereas by my process by changing the old method of manipulation and the physical character and proportions of the ingredients so that pigments may be admixed, I have created a material which may be used for a floor covering, interior decorating and an entirely new field of artistic and useful purposes, said material having further superior functions over old fibrated compositions in its resiliency, high chemical and heat resistance and permanency under constant use.

By my invention I seek to introduce pigments into a mixture of pitch and asphalts at such time in the process and in such a manner as to produce fibrous compounds of any desired color and brilliancy suitable for many kinds of artistic and useful purposes, these pigments being selected for their heat resisting quality as well as for color.

I utilize as the basis of my invention the fact that prepared tar or pitch having as its basis the residuum of distillation of fatty acids when drawn into the sheets, will possess considerable translucency. Thus the incorporation of coloring matter into such a mass will give desirable results, whereas with any other tarry material with which I am familiar the incorporation of coloring matter does not give perceptible results of practical nature. The candle tar of itself has the translucent quality and this is not lost in the oxidation treatment or in such hardening and tempering as is required to give the necessary body to the mass. In fact the addition of a low percentage of certain asphalts to a candle tar will result in increasing the color brilliancy.

I will describe in detail the steps of a process which is applicable to the manufacture of such a composition suitable for making floor tiling.

To a suitable prepared pitch such as, for example, the product made by the Proctor and Gamble Company and known as "Pitchene," or any other tarry residuum from the distillation of animal or hydrogenized vegetable fats and fatty acids which has been treated to render it non-oxidizable and which is thus low in free carbon, I add sufficient asphalt to give the desired consistency and increase the color brilliancy and paper or other fibrous material such as, for example, wood flour and by controlling the temperature, speed of operation and texture I accomplish fibration in the usual manner. (See for example, U. S. Patent to Woodley, No. 1156122 issued Oct. 12, 1915, wherein a water treated fibre is kneaded into a bituminous mass.) Into the molten mixture I introduce a pigment of the desired color and which has high enough heat resistance to keep its color during fibration. Iron oxide will produce a red color, for example, and certain other known pigments will produce other colors.

With the pigment carefully introduced into the molten mixture and passed through the fibration process, the coloring matter is physically absorbed into the texture of the product so that the dull black color is transformed into the shade of the pigment. The mixture is then worked or drawn through rolls, same being water cooled by preference by which it can be made into sheets or forms of any desired thickness or size.

The drawings illustrates a use of my new product in the form of tiles for floor covering or other interior decorative work. As shown in the drawings, the tiles 1 may be cut from the sheet with tongues 2 and grooves 3 and assembled into any desired arrangement for floor tiling.

I employ the material known as pitchene, a candle tar product because it comes already treated to give it body and consistency, although I prefer to add, in accordance with known practices, such proportions of various asphalts as will give the texture, and "penetration test," as is desired for particular instances of use, and as noted these asphalts through some action unknown to me, increase the color brilliancy.

From the point of view of durability I have experimented for a considerable period of time in greatly exposed places, with the material above described employed as a floor covering, and find its wearing qualities to be very remarkable and that it possesses the various qualities required for flooring which other fibrated pitches do not.

Having thus described my invention, what I claim as new and desire to secure by Letters Patent, is:—

1. A fibrous composition comprising a candle tar base suitably treated to prevent oxidation and give desired strength and resiliency a coloring matter, and fibre, incorporated together by the fibration process.

2. A new and useful material for floor coverings which comprises a fibrated non-oxidizable candle tar tempered with asphalt, with coloring matter incorporated therein.

3. A new and useful fibrous composition which consists in a candle tar base suitably treated to prevent oxidation, and to give desired penetration test, same being fibrated with suitable fibre.

4. That process of forming a suitable flooring which consists in mixing together in a heated state, candle tar and tempering asphalts and a heat resisting pigment and kneading with said mixture a water treated fibre, for the purpose described.

ALAN R. LUKENS.